Aug. 6, 1968  R. D. KOPA  3,395,899

CARBURETOR

Filed Sept. 28, 1965  3 Sheets-Sheet 1

Fig.1

INVENTOR.
RICHARD D. KOPA
BY Forrest J. Lilly
ATTORNEY

United States Patent Office 3,395,899
Patented Aug. 6, 1968

3,395,899
CARBURETOR
Richard D. Kopa, Van Nuys, Calif., assignor to The Regents of the University of California, a corporation of California
Filed Sept. 28, 1965, Ser. No. 490,823
15 Claims. (Cl. 261—22)

ABSTRACT OF THE DISCLOSURE

A fuel-atomizing carburetor having means for regulating the air-fuel ratio of the combustible mixture delivered to the engine according to prescribed characteristics. This air-fuel ratio regulating means comprises a primary fuel metering means which is operatively connected to the throttle valve of the carburetor for metering fuel flow to the induction air stream flowing through the carburetor in accordance with a continuous function of the throttle valve setting when the manifold intake vacuum and the pressure drop across the throttle valve are critical or above, such that changes in the engine intake manifold vacuum do not affect the induction air flow rate through the carburetor, and a secondary fuel metering means for metering fuel flow to the induction air stream when the pressure drop across the throttle valve is less than critical. In a first described embodiment, the secondary fuel metering means is activated in response to engine intake manifold vacuum when the pressure drop across the throttle valve becomes less than critical. In a second embodiment, the secondary fuel metering means operates in response to the flow rate of the induction air upstream of the throttle, and may be set to become operative when this flow rate becomes sufficiently high to effect accurate metering of the fuel and before the pressure drop across the throttle valve actually drops below critical.

---

This invention relates generally to carburetors for internal combustion engines and has more particular reference to improvements in fuel atomizing carburetors.

In recent years, air pollution has become a major problem and, as a consequence, the subject of numerous research programs throughout the world. These research programs have determined that the exhaust emissions from motor vehicle engines constitute a major cause of air pollution and that the major contaminants present in such exhaust emissions are carbon monoxide, unburned hydrocarbons, and nitrogen oxides.

My copending application Ser. No. 345,881, filed Feb. 19, 1964, and entitled Fuel Atomizing Carburetors discloses improved carburetors for internal combustion engines which are effective to substantially reduce the three major exhaust contaminants, just listed. Generally speaking, the carburetors disclosed in that application accomplish such contaminant reduction by utilizing two well-known carburetion techniques, to wit, introducing exhaust gas or other inert fluid into the combustible mixture entering the engine, and effecting total vaporization of the fuel and complete homogeneous intermixing of the fuel vapor, induction air, and recycled exhaust gas in the combustible mixture prior to admission of the latter to the intake manifold of the engine. Recycling of exhaust gas or other inert fluid through the engine during each combustion cycle reduces the peak combustion temperature and, thereby, the formation of nitrogen oxides. Total vaporization of the fuel and complete homogeneous intermixing of the fuel vapor, induction air, and recycled exhaust gas cooperate to permit engine operation at a relatively lean air-fuel ratio and, thereby, achieve more complete combustion of the fuel. Such complete fuel combustion, in turn, reduces the concentration of unburned hydrocarbons and carbon monoxide in the engine exhaust.

While it was known, before the invention disclosed in my aforementioned copending application, that the above-discussed carburetion techniques are effective to reduce the concentrations of nitrogen oxide, unburned hydrocarbons, and carbon monoxide present in the exhaust from an internal combustion engine, no prior carburetors, to my knowledge, are capable of utilizing these techniques. This is due, primarily, to the fact that the prior carburetors are ineffective to achieve total vaporization of the fuel and/or complete homogeneous intermixing of the fuel vapor, induction air, and recycled exhaust gas. As a consequence, engines equipped with the prior carburetors are prone to power surging and other operational deficiencies.

One primary aspect of the invention disclosed in my aforementioned copending application is concerned with achieving the total fuel vaporization and complete homogeneous intermixing of fuel vapor, induction air, and recycled exhaust gas necessary to attain maximum reduction of nitrogen oxides, unburned hydrocarbons, and carbon monoxide without such power surging and other operational deficiencies. According to this aspect of my earlier invention, the fuel is injected into the induction air stream in a finely divided or atomized state and the carburetor body is shaped to induce cyclonic flow of the fuel, induction air, and recycled exhaust gas through the mixing chamber which is externally heated. This cyclonic flow serves the twofold function of centrifugally driving the unvaporized droplets of fuel outwardly against the heated wall of the mixing chamber, where these droplets are vaporized, and thoroughly intermixing the fuel vapor, induction air, and exhaust gas to form a completely homogeneous combustible mixture for introduction into the engine intake manifold.

A second primary aspect of the invention disclosed in my aforementioned copending application is concerned with regluating the rate of fuel injection into the induction air stream in such manner as to maintain the proper air-fuel ratio over the entire engine operating range. According to this aspect of the invention, the fuel is injected into the induction air stream through a fuel injection nozzle having a metering valve, or needle, which is adjustable to regulate the rate of fuel injection. This needle valve is mechanically linked to the throttle valve in such a way that both valves are operated simultaneously from the throttle pedal to maintain the proper air-fuel ratio at different throttle settings. Such unified adjustment of the throttle valve and the needle valve of the fuel injection nozzle, however, is effective to maintain the proper air-fuel ratio only under certain engine operating conditions, to wit, during relatively steady state engine operation when the induction air flow through the carburetor remains constant at a given throttle valve setting regardless of intake manifold vacuum. This condition of constant induction air flow at a given throttle valve setting exists only when the pressure drop across the throttle valve is critical so that fluctuations in the downstream pressure, i.e., intake manifold vacuum, produce no change in the induction air flow past the throttle valve. In a typical internal combustion engine, this critical pressure drop occurs across the throttle valve when the intake manifold vacuum equals or exceeds approximately 15 inches of mercury. When the intake manifold vacuum drops below 15 inches, due to increased loading on the engine, for example, the pressure drop across the throttle valve becomes less than critical. Under these conditions, the rate of induction air flow through the carburetor, at any given setting of the throttle valve, varies in accordance with a function of the intake manifold vacuum. In the absence of any fuel flow compensating action in the carburetor, on the other hand, the rate of fuel injection would remain relatively constant at a value determined by the fixed setting of the throttle valve. Such a relatively constant rate of fuel injection and variable rate of induction air flow obviously would result in a correspondingly variable air-fuel ratio. Moreover, during acceleration, it is necessary to enrich the combustible mixture delivered to the engine to provide additional engine power during acceleration.

Accordingly, in order to maintain the proper air-fuel ratio in my prior carburetors, over the entire engine operating range, it is necessary to regulate the rate of fuel injection in response to adjustment of the throttle valve when the intake manifold vacuum equals or exceeds the level required to produce a critical pressure drop across the throttle valve, i.e., 15 inches, and to regulate the rate of fuel injection in response to adjustment of the throttle valve and, in addition, to some other function of engine operation when the intake manifold vacuum drops below 15 inches, as during acceleration. In the carburetors disclosed in my copending application, this additional or compensating adjustment of the fuel injection rate is accomplished by regulating the pressure of the fuel delivered to the fuel injection nozzle in response to engine intake manifold vacuum.

While my prior carburetors are highly effective in reducing the concentration of nitrogen oxides, unburned hydrocarbons, and carbon monoxide present in the exhaust from an internal combustion engine, the latter carburetors possess certain deficiencies which this invention seeks to overcome. One of these deficiencies resides in the fact that certain of my prior carburetors require an air compressor or other means for supplying an atomizing gas under pressure to the fuel injection nozzle for atomizing the liquid fuel emerging from the nozzle. Such an air compressor or other atomizing gas supply means substantially increases the complexity and cost of the carburetors and requires frequent servicing and/or replacement to maintain the carburetors in proper operating condition. Another deficiency of my prior carburetors resides in the fact that the fuel pressure regulating system embodies in the carburetors is relatively costly and complex and requires periodic servicing and adjustment to maintain the carburetors in the proper operating condition.

It is a general object of the present invention to provide improved fuel atomizing carburetors which achieve the same or greater reduction in the exhaust emission of nitrogen oxides, unburned hydrocarbons, and carbon monoxide as the carburetors disclosed in my aforementioned copending application but which exhibit greater simplicity of construction, lower cost of manufacture, increased reliability of operation with minimum servicing and maintenance, and possess superior operating characteristics.

A more specific object of the invention is to provide improved fuel atomizing carburetors of the character described wherein intake manifold vacuum is utilized to induct flow of atomizing air through the fuel injection nozzles of the carburetors, thereby eliminating the necessity of employing compressors or other pressurizing means for this purpose, and wherein, further, fuel is supplied at substantially constant pressure to and is aspirated from the fuel injection nozzles by induction air flow through the carburetors and wherein, further, the flow rate of the induction air is utilized to effect an auxiliary fuel metering action for maintaining the proper air-fuel ratio when the intake manifold vacuum drops below the level required to produce a critical pressure drop across the throttle valve, i.e., 15 inches, thereby eliminating the necessity of employing a fuel pressure regulating system for these purposes.

A further object of the invention is to provide improved fuel atomizing carburetors of the character described which possess superior operating characteristics including automatic enrichment of the combustible mixture delivered to the engine during acceleration and under excessive engine loading, permit greater ease of engine starting, particularly under cold engine conditions, and achieve rapid engine response to acceleration commands.

A still further object of the invention is to provide improved atomizing carburetors of the character described which are relatively simple in construction, reliable in operation, economical to manufacture, require minimum servicing, and are otherwise ideally suited to their intended purposes.

Briefly, the objects of the invention are attained by providing fuel atomizing carburetors equipped with a mixing chamber, a throttle valve upstream of the chamber, a fuel injection nozzle between the throttle valve and the chamber, and an auxiliary fuel metering means including an induction air flow rate sensor, such as a booster venturi, upstream of the throttle valve. The carburetors embody a primary fuel metering means including a fuel metering needle valve in the fuel injection nozzle which is linked to the throttle valve for simultaneous adjustment thereof by operation of the throttle pedal. The nozzle has an atomizing air passage which communicates to the main induction air passage upstream of the throttle valve or directly to atmosphere. The carburetors are preferably equipped with means for introducing exhaust gas and blowby into the induction air stream upstream of the mixing chamber and inducing flow of water from the engine jacket or exhaust gas over the exterior surface of the mixing chamber wall for heating this wall.

During engine operation, the discharge end, or tip, of the fuel injection nozzle and the interior of the mixing chamber are exposed to engine intake manifold. Accordingly, during engine operation, there exists between the ends of the atomizing air passage in the nozzle a pressure differential which induces flow of induction air through the passage. Fuel is aspirated from the nozzle by the combined action of the intake manifold vacuum existing at the nozzle tip, the atomizing induction air issuing through the nozzle tip, and the main stream of induction air flowing past the nozzle tip. The aspirating action of this main stream of induction air is amplified by directing the air through a venturi surrounding the nozzle tip. The liquid fuel emerging from the nozzle is atomized by the emerging atomizing air and combines wtih the stream of induction air and exhaust gas entering the mixing chamber. The mixing chamber is preferably constructed like that disclosed in my copending application Ser. No. 424,970, filed Jan. 12, 1965, now Patent No. 3,336,017 and entitled Compound Cyclonic Flow Inductor and Improved Carburetor Embodying Same, which induces cyclonic flow of the mixture through the chamber. This cyclonic flow drives unvaporized fuel droplets outwardly against the heated wall of the mixing chamber, where the droplets are vaporized, and effects intimate mixing of the fuel vapor, induction air, and exhaust gas to provide a homogeneous combustible mixture for delivery to the engine intake manifold.

When the vacuum level existing in the mixing chamber of the carburetor equals or exceeds approximately 15 inches, the pressure drop of the induction air across the throttle valve becomes critical and the flow rate of induction air through the carburetor, for any given throttle valve setting, remains constant irrespective of the vacuum level in the mixing chamber. Accordingly, simultaneous adjustment of the throttle valve and the needle valve in the injection nozzle is effective to maintain the proper air-fuel ratio. When the engine intake manifold vacuum drops below 15 inches due to sudden opening of the throttle valve or increased loading of the engine, the rate of fuel injection and the rate of induction air flow, at any given setting of the throttle valve, vary in response to, but according to different functions of, the intake manifold vacuum. Accordingly, it is necessary to regulate the rate of fuel injection into the induction air stream independently of the throttle valve setting.

In the present improved carburetors, this independent regulation of the rate of fuel injection is effected by an auxiliary fuel metering means in response to the flow rate of induction air through a flow rate sensor or booster venturi embodied in the auxiliary fuel metering means. In one illustrative embodiment of the invention, for example, the throat of the booster venturi is placed in direct communication with the float bowl of the carburetor in such a way that fuel is injected into the induction air stream, via the booster venturi, at a rate proportional to the flow rate of induction air through the venturi. The auxiliary fuel metering means are equipped with means for activating the auxiliary metering means when the vacuum level in the mixing chamber drops below approximately 14 to 15 inches. In this form of the invention, all of the fuel is supplied through the fuel atomizing nozzle in the range of high manifold vacuum levels exceeding 14 to 15 inches, fuel is supplied through both the nozzle and the auxiliary metering means in the range of medium vacuum levels between 5 inches and 14 inches, and all of the fuel is supplied through the auxiliary metering means in the range of low manifold vacuums below 5 inches. In the second illustrative embodiment of the invention, the induction air flow rate sensor or booster venturi of the auxiliary metering means communicates to a pneumatic actuator which is operatively connected to the needle valve of the fuel atomizing nozzle for positioning the needle valve independently of the throttle valve and in response to the flow rate of induction air through the booster venturi. Accordingly, all of the fuel is supplied, under all operating conditions, through the fuel atomizing nozzle. In this latter form of the invention, the auxiliary fuel metering means is activated in response to the rate of induction air flow through the booster venturi. The auxiliary metering means may be set to become operative when this flow rate becomes sufficiently high to effect accurate positioning of the needle valve of the fuel nozzle. However, the auxiliary fuel metering means must be operative when the pressure drop across the throttle valve drops to a value less than critical.

Both disclosed carburetors are also equipped with means for enriching the combustible mixture delivered to the engine during cold starting, acceleration and high engine loading.

The invention will now be described in greater detail by reference to the attached drawings, wherein.

Figure 1:
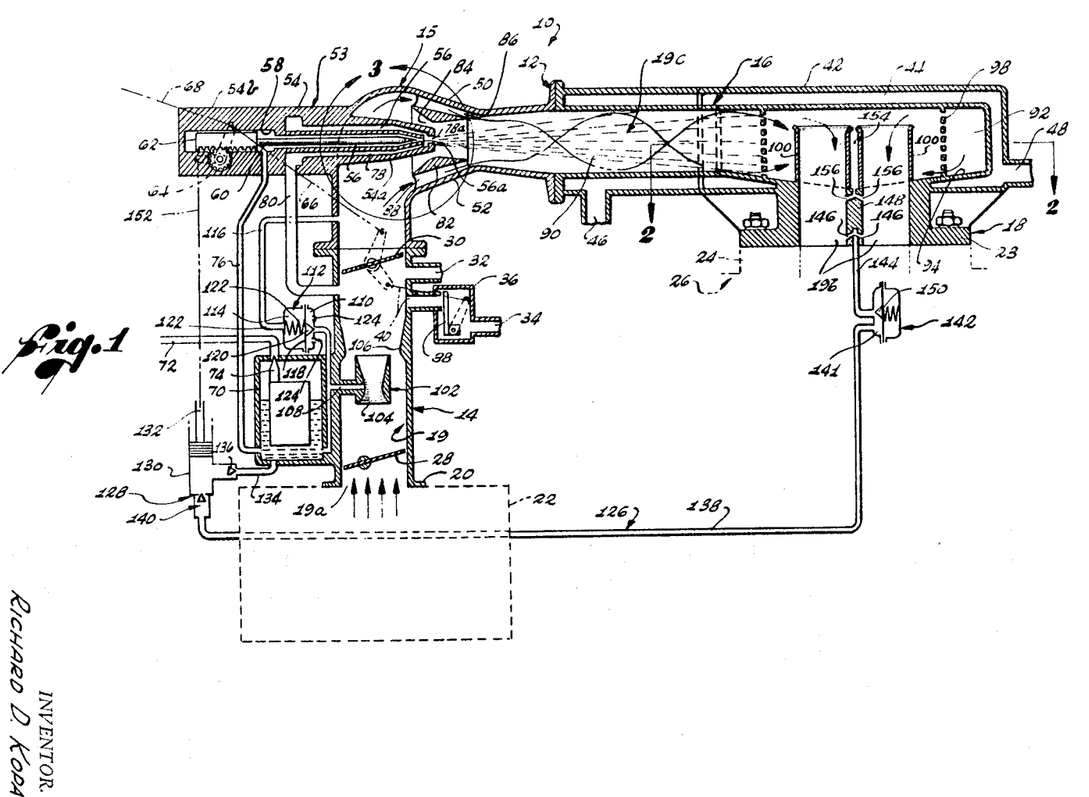
FIG. 1 illustrates an improved fuel atomizing carburetor according to the invention.
Figure 2:
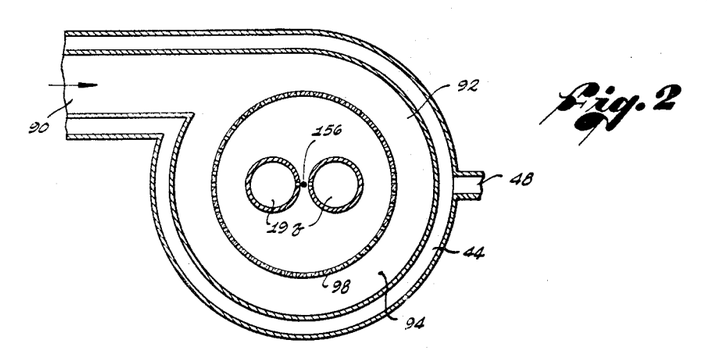
FIG. 2 is a section taken on line 2—2 in FIG. 1.
Figure 3:
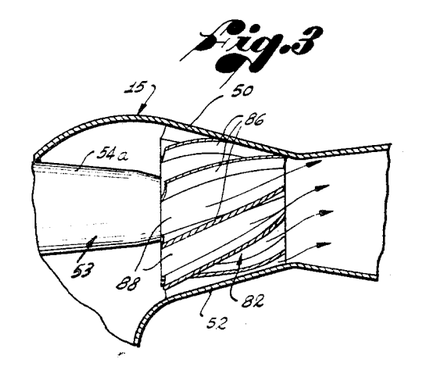
FIG. 3 is an enlargement of the area encircled by the arrow 3 in FIG. 1.

The improved fuel atomizing carburetor 10 illustrated in FIGS. 1-3 of these drawings comprises a generally tubular, L-shaped housing 12 including an elongate, normally vertical inlet section 14, a fuel injection section 15, an elongate, normally horizontal mixing section 16, and a relatively short, normally vertical outlet section 18. Extending through the housing is an induction air passage 19 defining an induction air inlet 19a at one end of the passage, combustible mixture outlets, or carburetor barrels, 19b at the other end of the passage, and a mixing chamber 19c within the mixing section 16. The inlet section 14 terminates, at its inlet end, in a mounting flange 20 adapted for connection to an air cleaner 22. The outlet end of the outlet section 18 terminates in a mounting flange 23 adapted for attachment to the intake manifold 24 of an internal combustion engine 26, in place of the standard carburetor. To this end, the mounting flange 23 is shaped and drilled to match the mounting flange of the standard carburetor. The particular fuel atomizing carburetor 10 illustrated in the drawings is an updraft carburetor which is particularly adapted for installation on V-8 engines. As will appear from the ensuing description, however, the present fuel atomizing carburetor may be otherwise designed to serve as a downdraft carburetor or a horizontal draft carburetor and may be adapted for installation on any type of internal combustion engine.

Rotatably mounted within the housing inlet section 14 are a choke valve 28 and a throttle valve 30. Choke valve 28 is situated adjacent the induction air inlet 19a. The throttle valve is situated adjacent the fuel injection section 15.

Extending from the wall of the inlet section 14, between the choke valve 28 and the throttle valve 30, are two conduits 32 and 34. When the carburetor 10 is installed on the engine 26, the conduit 32 is connected to the engine crankcase for the purpose of exhausting engine blowby from the crankcase into the induction air stream entering the carburetor through the inlet 19a. Conduit 34 is connected to the engine exhaust manifold to permit recycling of engine exhaust gas into the induction air stream. As noted earlier, such exhaust gas recycling is effective to substantially reduce the concentration of nitrogen oxides in the engine exhaust. The exhaust conduit 34 is enlarged to form a chamber 36 in which is pivotally mounted a flapper valve 38. Flapper valve 38 is connected, by linkage 40, to the throttle valve 30 in such a way that the flapper valve is closed when the throttle valve occupies its idling position and its full throttle position. This is necessary to cut off the admission of exhaust gas into the induction stream during idling and full throttle operation of the engine 26, thereby to provide the engine with maximum power under these operating conditions.

Encircling the mixing section 16 of the carburetor housing 12 is a heating jacket 42. The wall of the mixing section and the heating jacket define therebetween an annular flow space 44. Extending from the heating jacket 42, at opposite ends of the flow space 44, are conduits 46 and 48. When the carburetor 10 is installed on the engine 26, the conduit 46 is connected to the engine exhause manifold and the conduit 48 is connected to the engine exhaust pipe in such a way that exhaust gas is induced to flow through the annular flow space 44 and over the exterior surface of the mixing section 16 for externally heating this section.

The fuel injection section 15 of the carburetor housing 12 comprises a 90° elbow 50. The inlet end of this elbow has the same internal diameter as the downstream end of the inlet section 14. The outlet end of the elbow 50 is tapered to define a venturi portion 52 coaxially aligned with and opening to the inlet end of the mixing section 16. Mounted on the elbow 50 is a fuel injection nozzle 53 which is shown to be a conventional pneumatic fuel atomizing nozzle of the internal mixing type. The nozzle has its central axis aligned with the central axis of the mixing section 16. Nozzle 53 comprises a body 54 integrally formed with the elbow 50 and including a forward, conical tip 54a which is located internally of the elbow and a rear extremity 54b which is located externally of the elbow. Extending axially through the nozzle body 54 is a fuel passage 56. The forward end of this fuel passage is tapered and terminates in a fuel orifice 56a. The rear end of the fuel passage opens to an axial bore 58 in the rear extremity 54b of the nozzle body. Axially movable within the fuel passage 56 is a needle valve 60. This needle valve has a tapered forward end which is movable into and out of the fuel orifice 56a to regulate fuel flow therethrough. The rear end of the needle valve is secured to a rack 62 movable in the rear nozzle bore 58. Rack 62 meshes with a pinion 64 rotatably mounted within the nozzle body 54. Pinion 64 is connected by linkage 66 to the throttle valve 30. The throttle valve, in turn, is connected by linkage 68 to the throttle pedal (not shown). Accordingly, operation of the throttle pedal is effective to simultaneously position the throttle valve 30 and the needle valve 60.

Integrally formed with the wall of the carburetor inlet section 14 is a float bowl or chamber 70. This float chamber is connected by a fuel line 72 to a fuel pump (not shown) which delivers fuel to the float chamber. Within the float chamber is a float valve 74 for controlling the admission of fuel to the float chamber. The lower end of the float chamber communicates, via a passage 76, to the fuel passage 56 in the fuel injection nozzle 53.

Surrounding the fuel passage 56 in the fuel injection nozzle 53 is an annular atomizing air passage 78. The forward end of this air passage is tapered and terminates in an orifice 78a which opens through the front end of the nozzle. The fuel orifice 56a opens to the atomizing air passage 78 upstream of the nozzle orifice 78a. A conduit 80 communicates the rear end of the atomizing air passage 78 to the main induction air passage 19 upstream of the throttle valve 30.

Concentrically disposed within the venturi portion 52 of the carburetor fuel injection section 15 is a venturi ring 82 which coaxially surrounds the front end of the fuel injection nozzle tip 54a. The nozzle tip and venturi ring define therebetween an annular venturi passage 84. Venturi ring 82 is joined to the wall of the fuel injection section 15 by a series of circumferentially spaced, generally helically inclined vanes 86. These vanes define therebetween a series of circumferentially spaced, helical air passages 88 about the outside of the venturi ring.

During operation of the fuel atomizing carburetor 10, the induction air entering the carburetor through the air inlet 19a flows upwardly through the carburetor inlet section 14 to the fuel injection section 15 and then through and about the exterior of the venturi ring 82 into the carburetor mixing section 16. The helical vanes 86 surrounding the venturi ring 82 impart a spinning motion to the induction air which flows about the exterior of the venturi ring 82, whereby the air undergoes cyclonic flow through the mixing section. The interiors of the fuel injection section 15 and mixing section 16 are exposed to the vacuum existing in the engine intake manifold 24. Accordingly, a pressure differential exists between the end of the atomizing air passage 80 which opens to the inlet section 14 and the air orifice 78a in the fuel injection nozzle 53. This pressure differential induces flow of induction air from the inlet section 14 through the orifice 78a of the nozzle. The suppression created by the high velocity flow of induction air through the annular orifice 84 and the venturi ring 82 and the manifold vacuum existing in the fuel injection section 15 cooperate to aspirate fuel from the nozzle 53 through the fuel orifice 56a. As the fuel emerges from the orifice 56a, it is atomized by and mixed with the high velocity atomizing air flowing through the nozzle. The atomized fuel and air emerge from the nozzle through the orifice 78a and combine with the induction air to form a combustible mixture which undergoes cyclonic flow through the mixing section 16. This combustible mixture contains any blowby gas and exhaust gas which are admitted to the inlet section 14 through the blowby conduit 32 and the exhaust gas recycling conduit 34.

As noted earlier, the mixing section 16 of the carburetor 10 is similar to that embodied in the carburetor disclosed in my aforementioned copending application Ser. No. 424,970. Thus, the mixing chamber 19c in the mixing section comprises an inlet chamber 90, the downstream end of which opens tangentially to an outlet chamber 92 having its central axis normal to the inlet chamber 90. Extending axially through the lower wall 94 of the outlet chamber 92 are the outlet passages, or barrels, 19b through which the combustible mixture flows from the carburetor 10 to the engine intake manifold 24. The illustrated carburetor, then, is a two barrel carburetor. As will appear from the ensuing description, however, the present carburetor may have any number of barrels.

For reasons which will appear presently, the lower wall 94 of the outlet mixing chamber 92 is conically tapered and has its low point situated on the axis of the latter chamber. Concentrically mounted within the outlet mixing chamber is a perforated annular wall 98. Mounted on and rising above the lower wall of the chamber 92, in coaxial relation with the carburetor barrels 19b, respectively, are imperforate sleeves 100.

At this point, it is evident that the combustible mixture furnished by the carburetor 10 undergoes simple cyclonic flow through the inlet mixing chamber 90, which flow involves axial motion of the mixture through the chamber and simultaneous rotary motion of the mixture about the longitudinal axis of the chamber. When it enters the outlet mixing chamber 92, the combustible mixture is subjected to an additional component of cyclonic motion involving rotation of the mixture about the axis of the latter chamber. Accordingly, the combustible mixture undergoes a compound cyclonic flow through the outlet mixing chamber. The combustible mixture flows from the outlet mixing chamber 92, through the perforated annular wall 98 and the two carburetor barrels 19b into the engine intake manifold 24. The perforated annular wall 98 serves to induce uniform flow of the combustible mixture into the carburetor barrels 19b throughout a full 360° of the outlet chamber 92. The sleeves 100 which rise above the lower wall 94 of the outlet mixing chamber are provided, in accordance with conventional carburetion practice, to create a ram or supercharging effect on the emerging combustible mixture prior to entrance of the latter into the engine intake manifold.

As noted earlier, the interiors of the fuel injection section 15 and the mixing section 16 are exposed to the vacuum existing in the engine intake manifold 24. Exposure of the atomized fuel emerging from the fuel injection nozzle 53 to the manifold vacuum existing in the carburetor mixing section 16 aids in achieving rapid and total evaporation of the atomized fuel droplets. Any fuel droplets which are not immediately vaporized are subjected to a centrifugal force, by virtue of the cyclonic flow of the combustible mixture through the mixing section 16. This centrifugal force impels the droplets radially outward into contact with the wall of the mixing section. Recalling that this wall is heated by exhaust gas flow through the heating jacket 42, it is evident that the liquid fuel droplets which impinge the wall are immediately vaporized and re-enter the main stream of combustible mixture flowing through the mixing section. Thus, the intake manifold vacuum existing in the mixing section 16 and the cyclonic flow of the combustible mixture through this section cooperate to effect total vaporization of the fuel in the mixture. The cyclonic flow of the mixture through the mixing section 16 is also effective to produce intimate mixing of the induction air, fuel vapor, exhaust gas, and blowby gas components of the mixture. Accordingly, the carburetor 10 is effective to supply to the engine intake manifold 24 a completely homogeneous combustible mixture entirely devoid of any unvaporized fuel.

When the intake manifold vacuum existing in the mixing section 16 of the carburetor 10 is on the order of 14 to 15 inches, or higher, the entering induction air undergoes a critical pressure drop across the throttle valve 30, whereby the rate of induction air flow through the carburetor remains constant at any given setting of the throttle valve, irrespective of the vacuum level in the mixing section. The orifice 78a of the fuel injection nozzle 53 is so dimensioned that the air-fuel mixture emerging through this orifice also undergoes a critical pressure drop through the latter orifice when the vacuum level in the mixing section equals or exceeds 14 to 15 inches. At this point, it is significant to note that when the pressure drop through the orifice 78a is critical, the pressure at the upstream end of the orifice, and hence the rate of fuel flow through the fuel orifice 56a, remains constant at any given throttle valve setting regardless of fluctuations in the manifold vacuum existing in the mixing section 16. Under these conditions, then, the proper air-fuel ratio, at different settings of the throttle valve, may be maintained by unified adjustment of the throttle valve and the needle valve 60 in the fuel injection nozzle. It will be recalled that this unified adjustment of the throttle valve and needle valve, in response to operation of the throttle pedal, is accomplished by the linkage connection 66 between these valves.

Assume now that the vacuum level in the mixing section 16 drops below 14 to 15 inches as a result of sudden opening of the throttle valve 30 or a sudden increase in the loading on the engine 26. The pressure drop experienced by the incoming induction air during its flow past the throttle valve 30 and the pressure drop experienced by the air-fuel mixture issuing through the orifice 78a of the fuel injection nozzle 53 become less than critical. Under these conditions, the rate of induction air flow through the carburetor, at any given setting of the throttle valve 30, and the rate at which fuel is aspirated or injected into the induction air stream from the fuel injection nozzle 53, at the corresponding setting of the needle valve 60, vary in response to changes in the intake manifold vacuum level existing in the mixing section 16. Moreover, the rate of induction air flow through the carburetor varies in accordance with one function of the vacuum level and the rate of fuel injection varies in accordance with another function of the vacuum level. Accordingly, when the intake manifold vacuum level drops below 14 to 15 inches, unified adjustment of the throttle valve 30 and the needle valve 60 is no longer effective to maintain the proper air-fuel ratio.

Accordingly, the fuel atomizing carburetor 10 is equipped with an auxiliary fuel metering means 102 which is effective to meter into the induction air stream, in response to its flow rate, the proper amount of fuel required to maintain the proper air-fuel ratio when the intake manifold vacuum level drops below 14 to 15 inches. The auxiliary fuel metering means 102 comprises a booster venturi 104 which is concentrically mounted within the inlet section 14 of the carburetor. Downstream of the booster venturi, the inlet section 14 is internally constructed to define a venturi 106, the throat of which is aligned with the downstream end of the booster venturi to induce induction air flow through the venturi. The throat of the booster venturi communicates, via a passage 108, to the lower end of the float chamber 70. Passage 108 also communicates to the right-hand chamber 110 of a diaphragm valve assembly 112. The left-hand chamber 114 of this valve assembly communicates, via a passage 116, to the interior of the fuel injection section 15, downstream of the throttle valve 30. Valve chambers 110 and 114 are separated by a flexible diaphragm 118 mounting a valve 120. Diaphragm 118 is urged to the right in the drawings, by a compression spring 122, to a closed position, wherein the diaphragm valve 120 seals the adjacent end of the passage 108. Diaphragm valve chamber 110 communicates to atmosphere through ports 124.

At this point, it is evident that when the diaphragm valve 120 occupies its closed position, the induction air flowing through the booster venturi 104 creates a suppression within the throat of the venturi which is effective to induce flow of fuel from the float chamber 70, through the passage 108, into the throat of the booster venturi. This fuel is carried by the induction air into the carburetor mixing chamber 19c wherein it combines with the fuel emerging from the fuel injection nozzle 53. The rate at which fuel enters the induction air stream through the booster venturi 104 is obviously a function of the flow rate of the air through the venturi. Assume now that the diaphragm valve 120 occupies its open position, wherein the passage 108 communicates to atmosphere through the ports 124 in the diaphragm valve assembly 112. Under these conditions, the suppression created in the throat of the booster venturi by the flow of induction air therethrough is ineffective to induce flow of fuel from the float chamber to the booster venturi.

It is apparent from the drawings that the vacuum level existing downstream of the throttle valve 30 creates a pressure differential across the diaphragm 118 of the diaphragm valve assembly 112 in a direction to urge the diaphragm valve 120 toward its open position, against the action of the diaphragm spring 122. This spring is selected to have a stiffness such that the diaphragm valve 120 is retained in its open position, against the action of the spring, when the intake manifold vacuum equals or exceeds 14 to 15 inches. When the vacuum level drops below 14 to 15 inches, the diaphragm spring 122 becomes effective to urge the diaphragm valve 120 to its closed position.

It is now evident, therefore, that when the vacuum level in the engine intake manifold 24 equals or exceeds 14 to 15 inches, the diaphragm valve 120 is retained in its open position, to deactivate the auxiliary fuel metering means 102, whereby all of the fuel enters the induction air stream through the fuel injection nozzle 53. Under these conditions, the proper air-fuel ratio is maintained by unified adjustment of the throttle valve 30 and the needle valve 60 in the fuel injection nozzle in response to operation of the throttle pedal. When the intake manifold vacuum drops below 14 to 15 inches, the spring 122 in the diaphragm valve assembly 112 becomes effective to urge the diaphragm valve 120 to its closed position, thereby activating the fuel metering means 102. Under these conditions, fuel enters the induction air stream through both the fuel injection nozzle 53 and the booster venturi 104. The combined rate of fuel injection is determined by the setting of the needle valve 60 and the rate of induction air flow through the booster venturi. A continued decrease in the intake manifold vacuum results in a progressively decreasing proportion of fuel injection through the fuel injection nozzle 53 and a progressively increasing proportion of fuel injection through the booster venturi 104 until, at very low vacuum levels, practically all of the fuel is injected into the induction air stream through the booster venturi.

Thus, the operation of a typical carburetor according to the invention may be divided into three ranges as follows: (1) low to medium engine loads and high manifold vacuum in excess of 14 to 15 inches; (2) medium to high engine loads and medium to low manifold vacuum in the range of 14 to 15 inches; and (3) full throttle-full load and low manifold vacuum less than 1 inch. In the first operating range, all of the fuel is supplied by the fuel injection nozzle 53 and the proper air-fuel ratio at different settings of the throttle valve 30 is maintained by unified adjustment of the throttle valve and the needle valve 60. In the second, or transistor, range, fuel is supplied both by the fuel injection nozzle and the auxiliary fuel metering means 102. In the third operating range, practically all of the fuel is supplied by the auxiliary fuel metering means. In the second and third operating ranges, then, the air-fuel ratio is determined by the setting of the needle valve and the rate of air flow through the booster venturi 104. The auxiliary fuel metering means is designed to meter into the induction air stream, at each setting of the throttle valve, the appropriate amount of fuel required to maintain the proper air-fuel ratio throughout the second and third operating ranges of the carburetor.

It will be observed in the drawings that the throttle valve 30 is situated a substantial distance from the engine intake manifold 24. Accordingly, in the absence of any compensating action, the response of the engine to an acceleration command would be delayed. To overcome this deficiency, and to provide for momentary enrichment of the combustible mixture delivered to the engine during acceleration, as is desirable for maximum power during acceleration, the present carburetor 10 is equipped with a secondary fuel injection system 126 for injecting fuel into the induction air stream, just prior to entrance of the latter into the engine intake manifold 24, in response to depression of the accelerator pedal. This secondary fuel injection means comprises a fuel pump 128 including a cylinder 130 and a piston 132 movable in the cylinder. Cylinder 130 communicates with the lower end of the float chamber 70 through a fuel inlet line 134 containing a check valve 136. This check valve permits fuel flow from the float chamber to the cylinder but blocks fuel flow in the reverse direction. Extending from the cylinder 130 is a fuel discharge line 138 containing a check valve 140. Check valve 140 permits fuel flow from the cylinder to the fuel line 138 and blocks fuel flow in the reverse direction. The fuel line 138 communicates to one chamber 141 of a diaphragm valve unit 142. Valve chamber 141 also communicates to the carburetor barrels 19b through a fuel line 144 and ports 146 in the intervening web 148 between the barrels. Mounted within the valve unit 142 is a spring-loaded diaphragm valve 150 which is normally urged to a closed position, wherein it seals the fuel line 144 leading to the carburetor barrels 19b, by the combined action of the valve spring and the suppression existing in the barrels.

The piston 132 of the secondary fuel injection means 126 is connected, by linkage 152, to the valve needle adjusting pinion 64 in the fuel atomizing nozzle 53. Linkage 152 is arranged in such a way that when the throttle pedal is depressed to accelerate, the piston 132 is driven downwardly in the cylinder 130 to expel fuel from the cylinder into the fuel discharge line 138. The resulting increase in the pressure of the fuel in the line reacts on the diaphragm valve 150 to open the latter and thereby permit injection of fuel directly into the carburetor barrels 19b through the fuel ports 146. When the accelerator pedal is released, the piston 132 is retracted upwardly in the cylinder 130 and additional fuel flows into the cylinder from the float chamber 70 to condition the secondary fuel injection means 126 for the next acceleration command. Thus, during each acceleration command, fuel is injected directly into the carburetor barrels 19b to provide instantaneous response of the engine 26 to the command. The secondary fuel injection system is so designed that the quantity of fuel thus injected into the carburetor barrels provides the engine with a slightly overrich mixture as is desirable to assure optimum engine performance during acceleration.

During cold starting of the engine 26, the wall of the carburetor mixing section 16 will be cold. Accordingly, a substantial quantity of liquid fuel will accumulate on the inner surfaces of the wall, thereby resulting in the delivery of a very lean mixture to the engine. In the absence of any corrective action, this condition would render difficult cold starting of the engine.

The present fuel atomizing carburetor 10 is designed to avoid this difficulty. Thus, it will be recalled that the lower wall 94 of the outlet mixing chamber 92 is conically tapered to a low point situated at the center of the wall. Extending through this low point of the chamber wall 94 is a passage 154 which communicates, via ports 156, to the carburetor barrels 19b. Thus, the liquid fuel which collects on the walls of the carburetor mixing section 16, during cold engine starting, will tend to flow, by gravity, to the low central point of the mixing chamber wall 94 and then drain by gravity through the passage 154 and the ports 156 into the carburetor barrels 19b. Priming fuel may be supplied to the engine for starting by depressing the accelerator pedal to operate the secondary fuel injection system 126. Drainage of liquid fuel from the inner surfaces of the carburetor mixing section 16 into the carburetor barrels, in conjunction with the fuel delivered by priming, provides sufficient fuel to the engine for easy cold engine starting.

Figure 4:
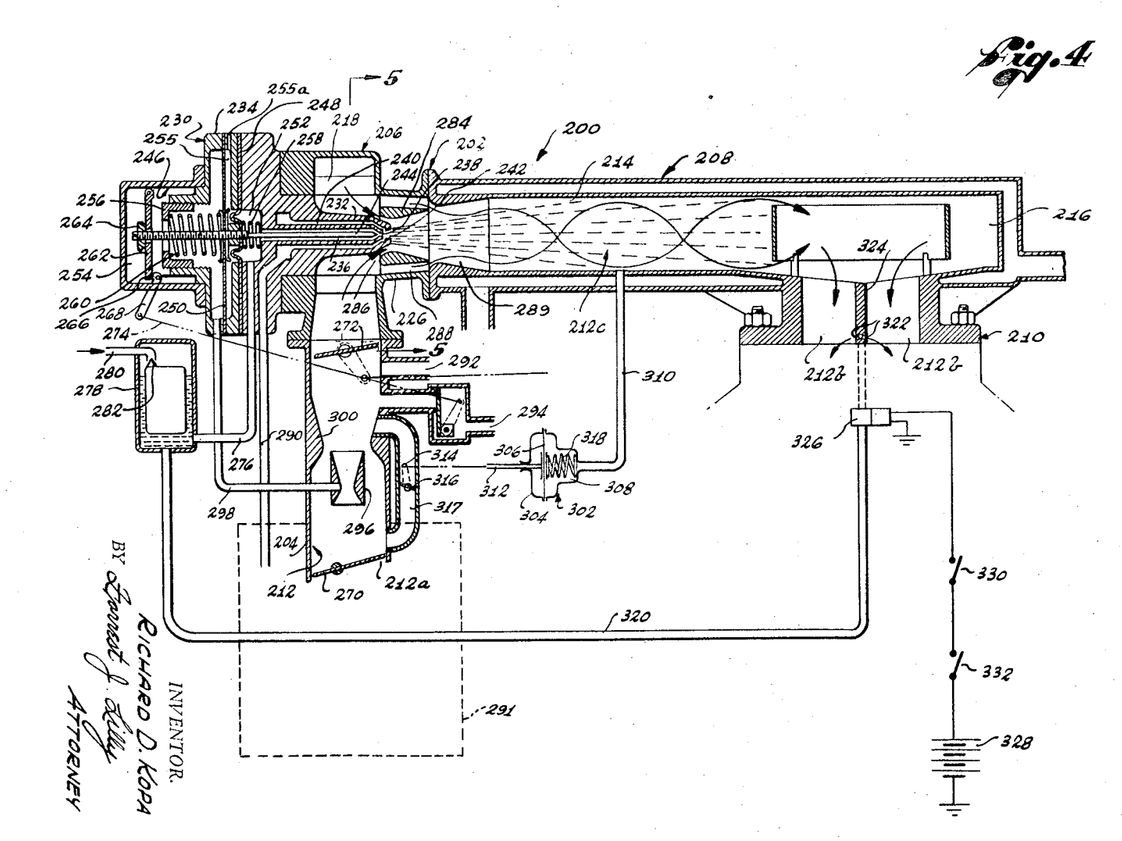
FIG. 4 illustrates a modified fuel atomizing carburetor according to the invention.

Reference is now made to FIG. 4 illustrating a modified carburetor 200 according to the invention. This carburetor comprises a housing 202 having an inlet section 204, a fuel injection section 206, a mixing section 208, and an outlet section 210. Extending through the carburetor housing is an induction air passage 212 defining an induction air inlet 212a at one end of the passage, combustible mixture outlet barrels 212b at the other end of the passage, and a mixing chamber 212c between the inlet and outlet barrels. Mixing chamber 212c includes an inlet chamber 214 and an outlet chamber 216.

Fuel injection section 206 contains a chamber 218 centered on the axis of the inlet mixing chamber 214. Chamber 218 opens tangentially to the inlet section 204 of the carburetor housing 202 and communicates axially with the inlet mixing chamber 214 through a tapered venturi portion 226 of the fuel injection section 206.

Mounted on the fuel injection section 206 is a fuel injection or atomizing nozzle 230 having its central axis aligned with the axis of the inlet mixing chamber 214. Nozzle 230 includes a forward, generally conically tapered tip 232 and a rear enlarged body 234. Nozzle tip 232 is located within the induction air passage 212 and extends coaxially through the chamber 218 in the fuel injection section 206. The rear nozzle body 234 is located externally of the fuel injection section. Extending axially through the nozzle tip 232 is a fuel passage 236. The forward end of this passage is conically tapered and terminates in a forwardly opening fuel orifice 238. Extending through the nozzle tip 232 in coaxial surrounding relation to the fuel passage 236 is an annular atomizing air passage 240. The forward end of this air passage is conically tapered and terminates in an orifice 242 which opens through the front end of the nozzle tip in coaxial relation to the fuel orifice 238. It is significant to note that nozzle 230, like the nozzle in the first embodiment of the invention, is of the internal mixing type. Axially movable in the fuel passage 236 is a needle valve 244. The forward end of this needle valve is conically tapered for regulating fuel flow through the fuel orifice 238. The rear end of the needle valve 244 extends axially through a chamber 246 in the rear nozzle body 234.

Peripherally sealed to the wall of the rear nozzle body 234 and extending across the chamber 246 therein are a pair of flexible diaphragms 248 and 250. The needle valve 244 extends centrally through and is sealed to these diaphragms. The forward diaphragm 248 defines, with the forward wall of the rear nozzle chamber 246, a forward chamber space 252 at the front side of the latter diaphragm. Chamber space 252 opens to the rear end of the nozzle fuel passage 236. The rear diaphragm 250 defines, with the rear wall of the nozzle chamber 246, a rear chamber space 254 at the rear side of the latter diaphragm. The chamber space 255 between the diaphragms communicates to atmosphere through a port 255a in the rear nozzle body 234. Mounted on the rear nozzle body 234, within the rear chamber space 254, is a spring seat 256. The rear extremity of the needle valve 244 extends through an enlarged opening in the spring seat 256. Within the forward chamber space 252 is a coil spring 258 which acts between the forward wall of the nozzle chamber 246 and the forward diaphragm 248. Spring 258 urges the needle valve 244 rearwardly toward its open position. Within the rear chamber space 254 is a coil spring 260 which acts between the rear diaphragm 250 and the spring seat 256. Spring 260 urges the needle valve 244 forwardly toward its closed position. Spring 260 has a higher strength than the spring 258 and thereby overrides the latter spring to normally retain the needle valve 244 in its idling position wherein the forward end of the valve is located within the fuel orifice 238 to effect minimum fuel flow through the orifice.

Pivotally mounted at its upper end on the rear nozzle body 234, within the nozzle chamber 246 and rearwardly of the spring seat 256, is a lever 262 having an enlarged opening through which the rear end of the needle valve 244 extends. Lever 262 seats against the front side of a thrust shoulder 264 on the needle valve. Rotatably mounted within the nozzle chamber 246 is an eccentric 266 which is engageable with the front side of the free end of the lever 262. An arm 268, located externally of the rear nozzle body 234, is fixed to the eccentric 266 for rotating the latter. At this point, it is evident that rotation of the eccentric arm 268 in one direction swings the lever 262 rearwardly about its pivot axis and thereby moves the needle valve 244 toward its open position against the action of the needle valve spring 260. Rotation of the eccentric arm in the opposite direction releases the needle valve for closing under the action of the spring 260.

Pivotally mounted within the carburetor inlet section 204, and upstream of the fuel atomizing nozzle 230, are a chock valve 270 and a throttle valve 272. Throttle valve 272 is connected, by linkage 274, to the eccentric arm 268 in such a way that rotation of the throttle valve toward its open position effects rearward movement of the needle valve 244 toward its open position. Rotation of the throttle valve toward its closed position releases the needle valve for return toward its closed position under the action of the needle valve spring 260. It is significant to note here that in any throttle valve setting, the needle valve may be moved rearwardly toward its open position independently of the throttle valve.

The forward chamber space 252 in the fuel atomizing nozzle 230 communicates, through a fuel line 276, to the lower end of a float chamber 278 for containing fuel at substantially constant pressure. Float chamber 278 receives fuel from a fuel pump through a fuel inlet line 280. A float valve 282 in the float chamber controls the flow of fuel to the chamber. Coaxially mounted within the venturi portion 226 of the fuel injection section 206 is venturi ring 284 which defines, with the tip 232 of the fuel atomizing nozzle 230, an annular venturi passage 286 about the tip. The venturi ring 284 is joined to the wall of the venturi portion 226 by struts 288. During operation of the carburetor 200, the induction air enters tangentially the chamber 218 in the fuel injection section 206, whereby the air is induced to undergo cyclonic flow in the latter chamber and through the following mixing chamber 212c. A portion of this spinning induction air flows through the annular venturi passage 286 and the interior of the venturi ring 284 to create a suppression at the front end of the nozzle tip 232 which cooperates with the intake manifold vacuum existing in the fuel injection section to aspirate fuel from the nozzle through the fuel orifice 238. The remainder of the spinning induction air flows about the exterior of the venturi ring 284. The air flowing through and about the venturi ring 284 combine at the downstream end of the ring and flow together through a following venturi 289 in the inlet of the mixing chamber 214.

The rear end of the atomizing air passage 240 in the fuel atomizing nozzle 230 communicates, via an air passage 290, to the air cleaner 291. During operation of the carburetor, the pressure drop across the throttle valve 272 induces atomizing air flow through the passage 290 and the air passage 240 in the nozzle. This atomizing air mixes with and atomizes the fuel emerging from the fuel orifice 238. The atomized mixture emerges from the nozzle 230 through the orifice 242 and combines with the induction air to form a combustible mixture. Such combustible mixture contains any blowby gas and exhaust gas which are recycled back into the induction air stream through passages 292 and 294 in the carburetor housing 202, as in the earlier carburetor of the invention.

The mixing chamber 212c, like the mixing chamber of the earlier carburetor, is externally heated by exhaust gas and is designed to induce compound cyclonic flow of the entering induction air, fuel, exhaust gas, and blowby gas. Accordingly, total vaporization of the fuel and intimate mixing of the induction air, fuel vapor, exhaust gas, and blowby gas are effected within the mixing chamber, whereby the carburetor 200, like the earlier carburetor, delivers to the engine a completely homogeneous combustible mixture.

It will be recalled that the needle valve 244 and throttle valve 272 are operatively connected, by the linkage 274, for adjustment thereof in unison. This unified adjustment of the throttle valve and needle valve is effective to maintain the proper air-fuel ratio, for various throttle valve settings, at relatively low engine speeds in the range between idling and, say 30 miles per hour, when the rate of induction air flow through the carburetor is relatively low. At higher engine speeds, the needle valve 244 is positioned in response to the flow rate of induction air through the carburetor. To this end, the carburetor 200 is equipped with a booster venturi 296 which is mounted within the inlet section 204 of the carburetor housing 202, upstream of the throttle valve 272. The throat of the venturi communicates, via a vacuum line 298, to the rear chamber space 254 in the fuel atomizing nozzle 230. An inlet section venturi 300 surrounds the downstream end of the booster venturi 296 in such a way as to induce flow of induction air through the latter venturi. It is now evident that induction air flow through the booster venturi 296, during operation of the carburetor 200, evacuates the rear chamber space 254 in the fuel atomizing nozzle 230 to a reduced pressure related to the rate of induction air flow through the carburetor and, thereby, creates a pressure differential across the rear nozzle diaphragm 250 related to the induction air flow rate. This pressure differential acts on the needle valve 244 in a direction to open the latter against the action of the needle valve spring 260. The accuracy with which induction air flow through the booster venturi 296 is effective to position the needle valve 244 is relatively low at the relatively low induction air flow rates which occur in the range of engine speeds between idling and 30 miles an hour. For this reason, the present carburetor 200 is designed so that in this range of engine speeds, the needle valve is positioned solely in accordance with a function of the setting of the throttle valve 272. To this end, the needle valve spring 260 is selected to have a strength such that the minimum rate of induction air flow through the booster venturi required to open the needle valve against the action of the spring corresponds to some predetermined engine speed, such as 30 miles per hour. Accordingly, at engine speeds exceeding this predetermined engine speed, the throttle valve 272 is positioned in response to operation of the throttle pedal and the needle valve 244 is positioned in response ot the rate of induction air flow through the carburetor. In this regard, it will be observed that induction air flow through the booster venturi 296, at any given throttle valve setting, is capable of positioning the needle valve 244 independently of the throttle valve in the range between the needle valve position corresponding to the given throttle valve setting and the full open position of the needle valve.

From the description, thus far, of the carburetor 200, it is evident that the needle valve 244 in the fuel atomizing nozzle 230 and the operative connection 262, 264, 274 between the needle valve and the throttle valve 272 provide a first fuel metering means which meters fuel to the induction air stream flowing to the carburetor in accordance with a function of the throttle valve setting. This fuel metering means is effective to regulate the air-fuel ratio of the combustible mixture delivered to the engine when the engine air demand is relatively low as, for example, when the engine speed is in the range between idling and 30 miles per hour. The nozzle diaphragm 250, vacuum line 298, and booster venturi 296 provide a second or auxiliary fuel metering means which meters fuel flow to the induction air stream in accordance with a function of the flow rate of the induction air through the carburetor. This auxiliary fuel metering means is effective to regulate the air-fuel ratio of the combustible mixture delivered to the engine at higher engine air demands, as, for example, when the engine speed exceeds 30 miles per hour.

As noted earlier, it is desirable, when accelerating, to momentarily enrich the combustible mixture delivered to the engine to increase the engine power available during acceleration. In the carburetor described earlier, this enrichment of the mixture is accomplished by an air-fuel ratio regulating means comprising an accelerating fuel pump which injects fuel directly into the carburetor outlet barrels during acceleration. In the carburetor 200, enrichment of the combustible mixture delivered to the engine during acceleration is accomplished by an air-fuel ratio is accomplished by an air-fuel ratio regulating means which increases the rate of induction air flow through the booster venturi 296 during acceleration. This latter air-fuel ratio regulating means comprises a pressure responsive actuator 302 including a housing 304. Peripheraly sealed to and extending across the interior of the housing 304 is a flexible diaphragm 306 which defines, with the wall of the housing, a sealed chamber 308 at one side of the diaphragm. Chamber 308 communicates to the inlet mixing chamber 214 through a vacuum line 310. Secured at one end to and extending from the opposite side of the diaphragm 306 is a link 312. The opposite end of this link is pivotally attached to an arm 314 which is fixed to a butterfly valve 316 pivotally mounted within a passage 317 in the inlet section 204 which bypasses the booster venturi 296. Disposed within the chamber 308 of the pressure responsive actuator 302 is a coil spring 318. This coil spring acts between the wall of the actuator housing 304 and the diaphragm 306 and urges the butterfly valve 316 to its closed position wherein air flow through the bypass 317 is cut off.

When the carburetor 200 is installed on an engine, the entire mixing chamber 212c of the carburetor, including its inlet chamber 214, is exposed to the intake manifold vacuum of the engine, as in the carburetor described earlier. The vacuum level existing in the inlet mixing chamber 214 during operation of the engine is communicated to the chamber 308 in the actuator 302 through the vacuum line 310 and is effective to create a pressure differential across the actuator diaphragm 306 in a direction to open the butterfly valve 316 against the action of the actuator spring 318. The actuator spring is selected to have a strength such that the buterfly valve 316 is retained in its open position against the action of the actuator spring 318, to permit induction air flow through the bypass 317, when the engine intake manifold vacuum existing in the inlet mixing chamber 214 equals or exceeds a predetermined vacuum level of approximately 7 inches. It is significant to note here that the induction air which flows through the bypass 317 does not pass through the booster venturi 296 and, therefore, does not effect any fuel metering action. When the maniofld vacuum existing in the inlet mixing chamber drops below the predetermined level, as during acceleration, the buterfly valve 316 is returned to its closed position by the action of the actuator spring 318 to cut off induction air flow through the bypass 317. Under these conditions, the induction air flow through the booster venturi 296 and, hence, the rate of fuel injection through the fuel injection nozzle 230 are increased accordingly. Thus, under steady state cruising conditions of the engine on which the carburetor 200 is mounted, the butterfly valve 316 is normally retained in its open position by the engine intake manifold vacuum. When the throttle valve 272 is suddenly opened to accelerate, the vacuum level in the inlet mixing chamber 214 drops. This results in closing of the buterfly valve 316 by the action of the actuator spring 318 to increase the total flow of induction air through the booster venturi and thereby effect momentary enrichment of the combustible mixture delivered to the engine. The valve 316 is re-opened by the engine intake manifold vacuum when the engine reaches its new steady state operating condition.

Figure 5:
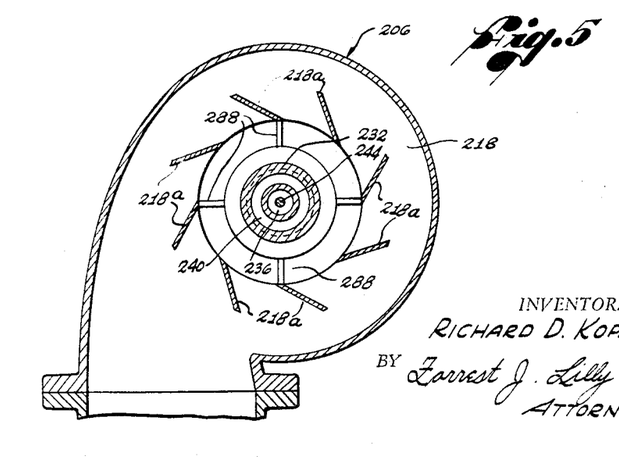
FIG. 5 is a section taken on line 5—5 in FIG. 4.

In order to facilitate starting of the engine, particularly when cold, the carburetor 200 is equipped with a fuel line 320 which communicates the lower end of the float chamber 278 to the carburetor outlet barrels 212b through ports 322 in the intervening web 324 between the barrels. mounted in this fuel line is a solenoid valve 326, the coil of which is electrically connected to the engine battery 328 through the starter switch 330 and the ignition switch 332. Thus, when the engine is started, the solenoid valve is momentarily opened when the starting switch 330 is closed to start the engine. The vacuum existing in the engine intake manifold during starting draws fuel directly into the carburetor barrels 212b through the fuel line 320 to furnish sufficient fuel to the engine for starting. Carburetor 200 is otherwise substantially identical to the carbureor 10 described earlier.

It is now evident that the invention provides fuel atomizing carburetors equipped with means for regulating the air-fuel ratio of the combustible mixture delivered to the engine under different engine operating conditions. This air-fuel ratio regulating means comprises a first fuel metering means which is operatively connected to the throttle valve of the carburetor for metering fuel flow to the induction air stream flowing through the carburetor in accordance with a function of the throttle valve setting when the pressure drop across the throttle valve is critical, such that changes in the engine intake manifold vacuum do not affect the induction air flow rate through the carburetor, and a secondary or auxiliary fuel metering means for metering fuel flow to the induction air stream when the pressure drop across the throttle valve is less than critical. In the first described embodiment of the invention, the auxiliary fuel metering means is activated in response to engine intake manifold vacuum when the pressure drop across the throttle valve becomes less than critical. In the second embodiment of the invention, the auxiliary fuel metering means is activated in response to the flow rate of the induction air and may be set to become operative when this flow rate becomes sufficiently high to effect accurate metering of the fuel and before the pressure drop across the throttle valve actually drops below critical. In a typical carburetor according to the invention, this flow rate occurs when the engine speed equals or exceeds approximately 30 miles per hour. Moreover, the first embodiment of the invention is equipped with an accelerating fuel pump for injecting fuel directly into the carburetor outlet barrels during starting and acceleration, thereby to enrich the combustible mixture delivered to the engine under these conditions. The second embodiment of the invention is equipped with a means responsive to engine intake manifold vacuum for reducing the induction air flow through the carburetor, and thereby enriching the combustible mixture delivered to the engine, during acceleration.

It is evident, therefore, that the invention herein described and illustrated is fully capable of attaining the several objects and advantages preliminarily set forth.

I claim:

1. A carburetor for supplying a combustible air-fuel mixture to the intake manifold of an internal combustion engine, comprising:
   a housing having an induction air passage defining an induction air inlet at one end of the passage, a combustible mixture outlet at the other end of the passage, and a mixing chamber between said inlet and outlet,
   a throttle valve in said passage upstream of said mixing chamber,
   fuel supply means including a fuel nozzle and means pneumatically and internally atomizing and mixing fuel at said nozzle for supplying fuel to said passage downstream of said throttle valve for mixing with the induction air stream entering said mixing chamber to form said combustible mixture, and means for regulating the air-fuel ratio of said mixture including first fuel metering means operatively connected to said throttle valve for continuously regulating the rate of fuel flow to said passage in accordance with a continuous function of the throttle valve setting throughout a range of throttle valve positions starting with idling position, and second fuel metering means for metering fuel flow to said passage independently of the throttle valve setting and in accordance with a function of induction air flow rate through said passage at a point in said passage upstream of said throttle valve.

2. A carburetor according to claim 1 wherein:

said second fuel metering means comprises a venturi mounted in said passage upstream of said throttle valve for sensing the rate of induction air flow through said passage, and means responsive to a predetermined intake manifold vacuum for activating said second fuel metering means.

3. A carburetor according to claim 1 wherein:

said fuel supply means comprises a fuel passage opening to said induction air passage and means for effecting fuel flow through said fuel passage into said induction air passage, said first fuel metering means comprises a fuel metering valve in said fuel passage downstream of the throttle valve operatively connected to said throttle valve for regulating fuel flow through said fuel passage in accordance with a continuous function of the throttle valve setting, and said second fuel metering means comprises means for sensing induction air flow rate through said induction air passage upstream of the throttle valve and means operatively connected to said flow rate sensing menas for metering fuel to said induction air passage in response to said induction air flow rate and independently of said fuel metering valve.

4. A carburetor according to claim 1 wherein:

said fuel supply means comprises a fuel passage opening to said induction air passage and means for effecting fuel flow through said fuel passage into said induction air passage, said first fuel metering means comprises a fuel metering valve in said fuel passage downstream of the throttle valve operatively connected to said throttle valve for regulating fuel flow through said fuel passage in accordance with a continuous function of the throttle valve setting, and said second fuel metering means comprises means for sensing induction air flow rate through said induction air passage upstream of the throttle valve and means operatively connected to said flow rate sensing means for regulating fuel flow through said fuel passage in response to said induction air flow rate and independently of the throttle valve setting.

5. A carburetor for supplying a combustible air-fuel mixture to the intake manifold of an internal combustion engine, comprising:

a housing having an induction air passage defining an induction air inlet at one end of the passage, a combustible mixture outlet at the other end of the passage, and a mixing chamber between said inlet and outlet, a throttle valve in said passage upstream of said mising chamber, a fuel atomizing nozzle having its tip located in said passage between said throttle valve and mixing chamber and including a fuel passage opening through said tip and a needle valve for regulating fuel flow through said fuel passage, means operatively connecting said needle valve and throttle valve for adjustment thereof in unison, a chamber for containing fuel, means defining a passage communicating the lower end of said chamber to said fuel passage, means within said induction air passage defining a venturi passage about said nozzle tip through which induction air is adapted to flow to aspirate fuel from said nozzle, a booster venturi within said induction air passage located upstream of said throttle valve, and a pneumatic actuator operatively connected to said needle valve and communicating with the throat of said venturi for positioning said needle valve to regulate fuel flow through said fuel passage independently of the throttle valve setting and in response to induction air flow rate through said venturi.

6. A carburetor for supplying a combustible air-fuel mixture to the intake manifold of an internal combustion engine, comprising:

a housing having an induction air passage defining an induction air inlet at one end of the passage, a combustible mixture outlet at the other end of the passage, and a mixing chamber between said inlet and outlet, a throttle valve in said passage upstream of said mixing chamber, fuel supply means for supplying fuel to said passage for mixing with the induction air stream entering said mixing chamber to form said combustible mixture, and means for regulating the air-fuel ratio of said mixture including fuel metering means operatively connected to said throttle valve for regulating the rate of fuel flow to said passage in accordance with a continuous function of the throttle valve setting, a booster venturi located upstream of the throttle valve for sensing downstream of said throttle valve the engine intake manifold vacuum, and means operatively connected to said booster venturi for regulating the relative rate of fuel and air flow to said mixing chamber independently of the throttle valve setting and in accordance with a function of induction air flow rate through said passage upstream of the throttle valve when said manifold vacuum drops to a predetermined level.

7. A carburetor for supplying a combustible air-fuel mixture to the intake manifold of an internal combustion engine, comprising:

a housing having an induction air passage defining an induction air inlet at one end of the passage, a combustible mixture outlet at the other end of the passage, and a mixing chamber between said inlet and outlet, a throttle valve in said passage, first fuel metering means operatively connected to said throttle valve for metering fuel to said passage in accordance wtih a function of the throttle valve setting, a booster venturi mounted within said induction air passage for sensing the flow rate of induction air through said passage, second fuel metering means operatively communicating with the throat of said venturi for metering fuel to said passage independently of the throttle valve setting and in accordance with a function of the induction air flow rate through said venturi, means defining a bypass passage communicating said induction air passage upstream and downstream of said booster venturi, pressure repsonsive means for sensing engine intake manifold vacuum, and a valve in said bypass passage operativley connected to said pressure responsive means for closing the latter passage when the manifold vacuum exceeds a predetermined level and opening the latter passage when the manifold vacuum drops below said level.

8. A pneumatic fuel atomizing carburetor for supplying an air-fuel mixture to the intake manifold of an internal combustion engine, comprising:
- a housing having an induction air passage defining an induction air inlet at one end of the passage, a combustible mixture outlet at the other end of the passage and a mixing chamber between said inlet and outlet;
- a throttle valve in said passage upstream of said mixing chamber;
- fuel supply means for supplying fuel to said passage for mixing with the induction air stream entering said mixing chamber to form said combustible mixture, said means including:
    - a fuel nozzle and means pneumatically and internally atomizing and mixing fuel at said nozzle, said nozzle being located downstream of the throttle and upstream of the mixing chamber;
- means for regulating the air-fuel ratio of said mixture, including primary metering means operatively connected to said throttle valve for regulating the rate of fuel flow to said passage in accordance with a continuous function of the throttle valve setting independently of air flow velocity upstream of the throttle,
- means including an air velocity sensing means located upstream of the throttle for additional control of the air-fuel ratio; and
- an auxiliary control means responsive to manifold vacuum.

9. A pneumatic fuel atomizing carburetor for supplying an air fuel mixture to the intake manifold of an internal combustion engine, comprising:
- a housing having an induction air passage defining an induction air inlet at one end of the passage, a combustible mixture outlet at the other end of the passage and a mixing chamber between said inlet and outlet;
- a throttle valve in said passage upstream of said mixing chamber;
- means for supplying fuel to said passage for mixing with the induction air stream entering said mixing chamber, including:
    - a fuel nozzle and means pneumatically and internally atomizing and mixing fuel at said nozzle, said nozzle being located upstream of said mixing chamber and downstream of said throttle valve; and
- means for regulating the fuel-air ratio of the mixture supplied to the manifold, comprising fuel metering means operatively connected to the throttle valve for regulating the rate of fuel flow to said passage from said nozzle in accordance with a continuous function of throttle valve setting throughout a range of throttle valve positions starting with idling position;
- an air velocity sensing means located in said passage upstream of the throttle valve, and
- fuel regulating means responsive to air flow velocity sensed by said sensing means for causing a fuel flow to said passage at a rate which is a function of air velocity in said passage upstream of said throttle valve.

10. The subject matter of claim 9, including means responsive to drop of manifold vacuum to a level just below the critical value of substantially 15 inches of mercury for activating said fuel regulating means.

11. The subject matter of claim 9, including means responsive to fall of intake vacuum to a predetermined value for increasing said air flow velocity to a predetermined level.

12. The subject matter of claim 9, including a secondary means for supplying fuel to said passage, in addition to said pneumatic fuel atomizing nozzle, for conveying to said passage said fuel flow which varies as a function of air flow velocity in said passage upstream of said throttle.

13. The subject matter of claim 9, including means for adjusting the fuel flow rate through said pneumatic fuel atomizing nozzle as a function of said air flow velocity in said passage upstream of said throttle.

14. The subject matter of claim 12, wherein said air velocity sensing means comprises a venturi, and said secondary means for supplying fuel comprises a fuel chamber and a fuel passage for communicating said fuel chamber to the throat of said venturi, and means responsive to intake manifold vacuum for conditioning said fuel passage to effect flow of fuel from said fuel chamber to the throat of said venturi.

15. A carburetor for an internal combustion engine, comprising:
- a carburetor housing having an induction air passage and fuel discharge means;
- a preliminary mixer duct for fuel and air extending linearly from said induction air passage;
- a mixing chamber of generally circular transverse section having a generally circular side wall with which said mixer duct tangentially merges to tangentially introduce a mixture of fuel and air into said chamber, and having opposite end walls;
- a baffle ring mounted in an annularly spaced position inside said chamber, opposed to said circular side wall and extending between and joined to said end walls, said baffle ring defining with said side wall a generally ring-shaped mixture circulation duct;
- said baffle ring being formed with a multiplicity of perforations around its periphery for passage of mixture, in the form of a multiplicity of jets, from said ring-shaped duct to the region inside said ring;
- mixture outlet means forming a mixture discharge flow passage leading from the space inside said baffle ring and adapted for coupling to the intake manifold of an engine;
- means for imparting to induction air flowing from said induction passage through said preliminary mixer duct and around said ring-shaped circulation duct a cyclonic rotation about a longitudinal axial direction line that extends linearly from said induction passage axially through said preliminary mixer duct to and tangentially into and thence axially around said ring-shaped mixture circulation duct; and
- said fuel discharge means comprising means for jetting an expanding pressure-gas-atomized spray of liquid fuel droplets into the cyclonically spinning air traveling down said preliminary mixer duct from a point adjacent the inlet end of the latter.

References Cited

UNITED STATES PATENTS

| | | | |
|---|---|---|---|
| 1,857,070 | 5/1932 | Thomas | 261—79 |
| 1,873,919 | 8/1932 | Ball et al. | 261—34 |
| 1,901,849 | 3/1933 | Moore. | |
| 1,984,327 | 12/1934 | Vaughan | 261—51 |
| 2,187,885 | 1/1940 | Markham | 261—69 X |
| 2,212,052 | 8/1940 | Schultz | 239—402 |
| 2,575,210 | 11/1951 | Ericson | 261—69 X |
| 2,655,356 | 10/1953 | Borcherts | 261—79 X |

FOREIGN PATENTS 230,165 3/1925 Great Britain.

RONALD R. WEAVER, *Primary Examiner.*